(12) United States Patent
Salamon (10) Patent No.: US 9,365,094 B2
(45) Date of Patent: Jun. 14, 2016

(54) STORABLE WINDSHIELD SYSTEM FOR A UTILITY VEHICLE

(71) Applicant: MTD Products Inc, Valley City, OH (US)

(72) Inventor: Jeff P. Salamon, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 6 days.

(21) Appl. No.: 14/490,164

(22) Filed: Sep. 18, 2014

(65) Prior Publication Data

US 2015/0076854 A1 Mar. 19, 2015

Related U.S. Application Data

(60) Provisional application No. 61/879,954, filed on Sep. 19, 2013.

(51) Int. Cl.
*A61G 1/02* (2006.01)
*B60J 1/02* (2006.01)
*B60J 3/00* (2006.01)
*B60J 1/04* (2006.01)

(52) U.S. Cl.
CPC .. *B60J 1/025* (2013.01); *B60J 1/04* (2013.01); *B60J 3/002* (2013.01)

(58) Field of Classification Search
CPC ............... B60J 1/025; B60J 1/04; B60J 3/002
See application file for complete search history.

(56) References Cited

U.S. PATENT DOCUMENTS

| 5,857,727 | A  | 1/1999  | Vetter          |
|-----------|----|---------|-----------------|
| 6,276,742 | B1 | 8/2001  | Deng et al.     |
| 6,279,984 | B1 | 8/2001  | Reina, Jr.      |
| 6,293,616 | B1 | 9/2001  | Williams et al. |
| 6,425,623 | B2 | 7/2002  | Nakayama        |
| 7,144,061 | B1 | 12/2006 | Behm et al.     |
| 7,156,444 | B1 | 1/2007  | Da Silva        |
| 7,172,233 | B2 | 2/2007  | Walker          |
| 7,503,607 | B2 | 3/2009  | Sersland et al. |
| 2012/0098290 | A1 | 4/2012 | Miller         |

FOREIGN PATENT DOCUMENTS

GB 2 430 696 4/2007

OTHER PUBLICATIONS

International Search Report and Written Opinion dated Nov. 27, 2014 for corresponding patent application No. PCT/US2014/056215.

*Primary Examiner* — Lori L Lyjak
(74) *Attorney, Agent, or Firm* — Wegman, Hessler & Vanderburg (57) ABSTRACT

A storable windshield system for a utility vehicle is provided, wherein the utility vehicle includes a frame to which a support structure is attached. The support structure includes front pillars and rear pillars extending from the frame. The system is operatively connected to the support system, and the system allows an operator to store a windshield onboard the utility vehicle when not needed as well as install the windshield over the front viewport during inclement weather without the need for tools. The windshield is slidable and rotatable relative to the roof member for storing and installing the windshield.

11 Claims, 6 Drawing Sheets

STORABLE WINDSHIELD SYSTEM FOR A UTILITY VEHICLE

CROSS-REFERENCE TO RELATED APPLICATIONS

This application claims benefit of U.S. Provisional Patent Application Ser. No. 61/879,954, filed Sep. 19, 2013, and entitled "STORABLE WINDSHIELD SYSTEM FOR A UTILITY VEHICLE," which is incorporated herein by reference in its entirety.

FIELD OF THE INVENTION

The present invention is directed to a utility vehicle, and more particularly, to a storable windshield system for a utility vehicle.

BACKGROUND OF THE INVENTION

Utility vehicles, such as those that are used for performing yard work, are often used in a variety of weather conditions. For example, the utility vehicle can be used to transport sod from one location on a property to another under ideal weather conditions. Alternatively, the utility vehicle can also be used to transport tubes or piping to various locations during raining or storming conditions. As such, the comfort needs of the utility vehicle operator can vary depending on the different weather conditions.

Typical utility vehicles known in the art either have a permanently-installed windshields or no windshield at all. However, the downside to each of these configurations is that if the utility vehicle is being used in day-to-day operations, the operator will experience changes in the weather conditions that may make the use of the utility vehicle uncomfortable. In particular, the operator will likely get completely wet when the utility vehicle that does not include a windshield is used during rainy conditions. On the other hand, the operator will have to look through a potentially dirty windshield during dry and sunny days when the utility vehicle that includes a permanent windshield is used during sunny or dry conditions.

One solution is to provide a removable windshield that can be installed or removed depending upon the current weather conditions. However, the disadvantage of such a removable windshield is that the utility vehicle typically does not include a storage location for the completely removable windshield. As such, if the weather conditions change throughout the course of the day, the windshield must either remain installed or remain stored at a location that may be an unreasonable distance to travel to simply re-attach it.

Therefore, the need exists for a storable windshield for a utility vehicle in which the windshield can be storable on or within the utility vehicle during ideal weather conditions and can be installable during inclement weather conditions without the need to retrieve the uninstalled windshield from a separate location.

BRIEF SUMMARY OF THE INVENTION

According to one aspect of the present invention, a storable windshield system attached to a support system of a utility vehicle is provided. The storable windshield system includes a roof assembly having a recess formed therein. A windshield assembly is operatively connected to the roof assembly. The windshield assembly is slidable relative to the roof assembly between a stored position and an extended position and rotatable relative to the roof assembly between the extended position and an installed position located immediately adjacent to the support system.

According to another aspect of the present invention, a storable windshield system attached to a support system of a utility vehicle is provided. The support system forms a front viewport for said utility vehicle. The storable windshield system includes a roof assembly attached to the support system. The roof assembly is formed of an upper shell and a lower shell attached to the upper shell, wherein the roof assembly defines a recess therewithin. A track assembly is operatively attached to the roof assembly within the recess. A windshield assembly is operatively connected to the track assembly, wherein the windshield assembly is slidable relative to the roof assembly for selectively storing the windshield assembly within the recess. The windshield assembly is rotatable relative to the roof assembly for selectively engaging the support system.

According to yet another aspect of the present invention, a storable windshield system is attached to a support system of a utility vehicle. The storable windshield system includes a roof assembly removably attachable to the support system. The roof assembly defining a recess therewithin. A track assembly is attached to the roof assembly within the recess, wherein the track assembly includes a pair of opposing rails. A windshield assembly is operatively connected to the track assembly, wherein the windshield assembly includes a windshield and a pair of wheel bearings attached to the windshield. The wheel bearings are engageable with the track assembly. The windshield is slidable relative to the rails between a first operative position and a second operative position, and the windshield is rotatable relative to the rails between the second operative position and a third operative position. The windshield is storable within the recess when in the first operative position and selectively engageable with the support system when in the third operative position.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 1:
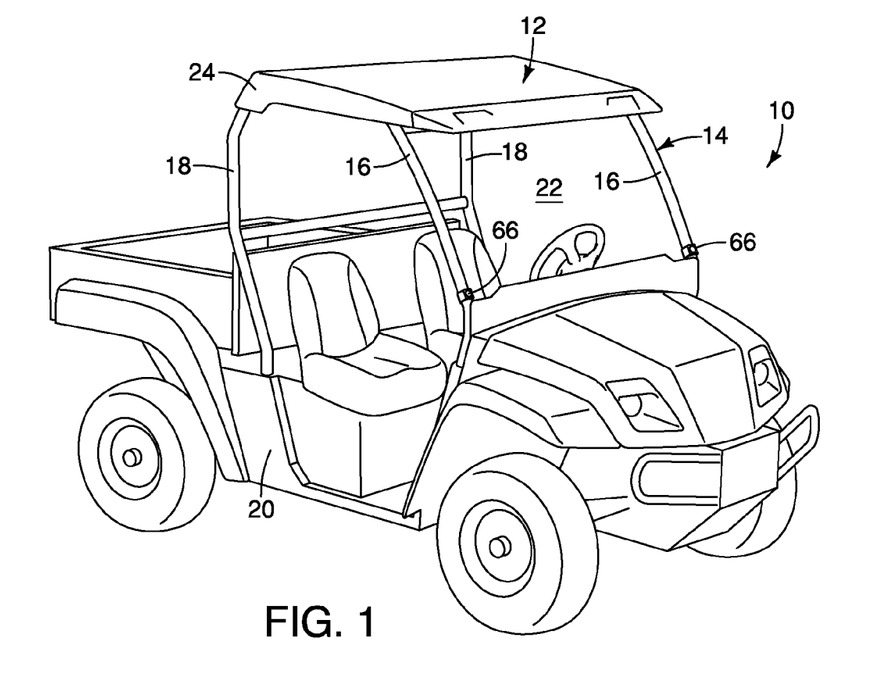
FIG. 1 is a top perspective view of a utility vehicle with a storable windshield system, wherein the windshield is located in the stored position.
Figure 2:
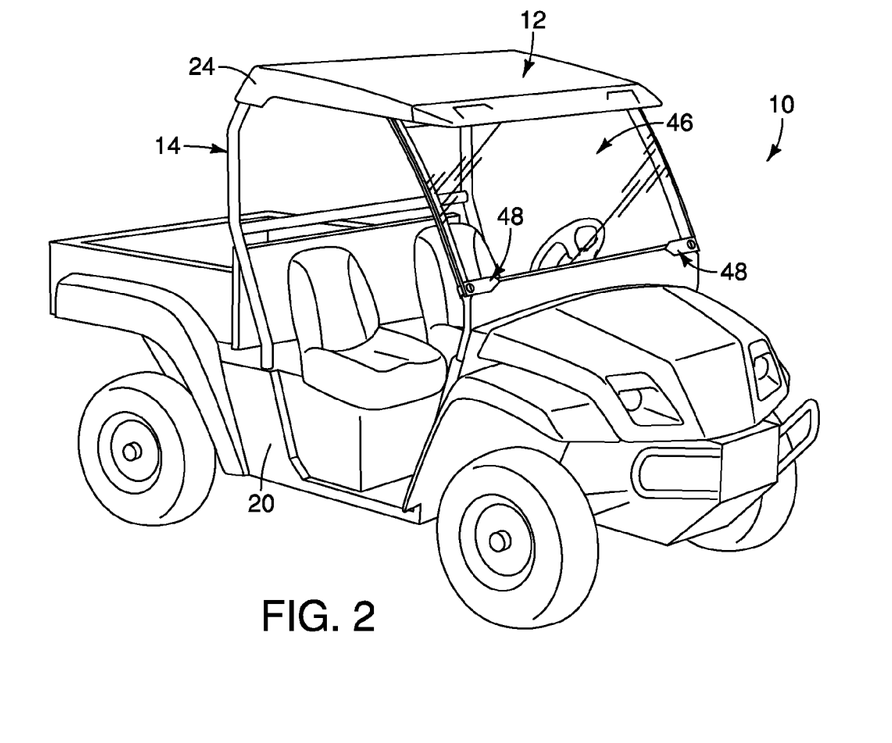
FIG. 2 is a top perspective view of the utility vehicle and storable windshield system shown in FIG. 1, wherein the windshield is located in the installed position.

Referring to FIG. 1-2, an exemplary embodiment of a utility vehicle 10 having a self-contained storable windshield system 12 is shown. FIG. 1 illustrates the windshield system 12 in the retracted, or stored position, and FIG. 2 illustrates the windshield system 12 in the extended, or installed position. The utility vehicle 10 includes a support system 14, such as a roll cage or the like, having a pair of front pillars 16 and a pair of rear pillars 18 extending upwardly from the frame 20, wherein the support system 14 includes laterally-aligned cross-bars 21 (FIG. 4) connecting the pillars 16, 18. The support system 14 is configured to support the windshield system 12. Although the illustrated embodiment includes a support system 14 configured to support the windshield system 12, it should be understood by one of ordinary skill in the art that any support system or frame for supporting a roof over a utility vehicle can be used to support the windshield system 12. A front viewport 22 is formed between the pair of front pillars 16, the windshield system 12, and the frame 20. The viewport 22 allows the operator to be able to clearly look forward between the front pillars 16 when seated in the utility vehicle 10. The front viewport 22 is framed by the front pillars 16 on the sides, the windshield system 12 along the top, and the frame 20 along the bottom.

Figure 3:
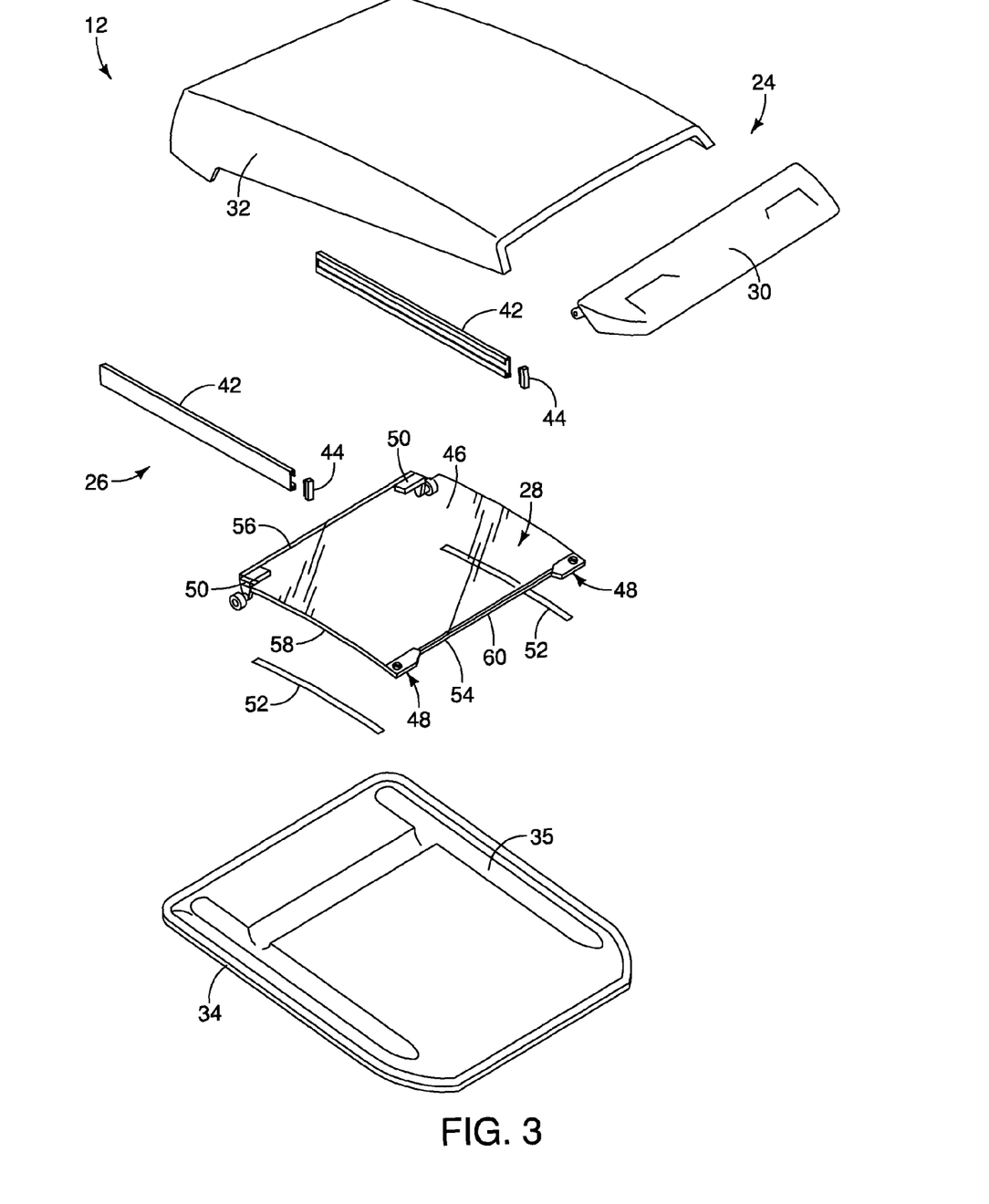
FIG. 3 is an exploded view of the storable windshield system shown in FIG. 1.

In an embodiment, the storable windshield system 12 includes a roof assembly 24, a track assembly 26 positioned within the roof assembly 24, and a windshield assembly 28 operatively connected to the track assembly 26 and selectively positioned within the roof assembly 24, as shown in FIG. 3. The roof assembly 24 forms a casing or protective covering to keep the windshield hidden and away from dirt, debris, and harmful conditions while also allowing the windshield to be withdrawn and utilized to cover the front viewport 22 when needed. The roof assembly 24 can be formed as a single piece or multiple pieces as well as a fully enclosed structure or a semi-enclosed structure for protecting the windshield.

Figure 4A:
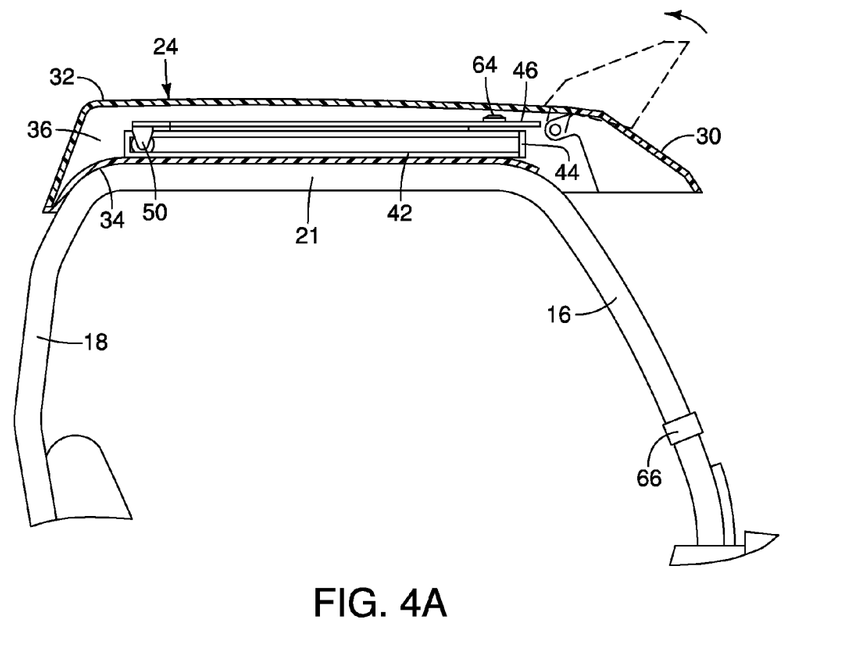
FIG. 4A is a cross-sectional view of the storable windshield system with the windshield in the stored position.

In an embodiment, the roof assembly 24 includes an upper shell 32, a lower shell 34, and a rotatable visor 30, as shown in FIGS. 3-4A. The upper and lower shells 32, 34 are attached to each other to form a hollow casing, thereby providing a recess 36 (FIG. 4A) defined between the visor 30 and the upper and lower shells 32, 34. The visor 30 and the upper and lower shells 32, 34 can be formed of molded plastic, stamped metal, fiberglass, or any other lightweight pliable material. The lower shell 34 includes a pair of aligned grooves 35 formed into the lower surface. The grooves 35 are configured to receive the cross-bars 21 of the support system 14 when the windshield system 12 is positively positioned atop the support system 14. A U-bolt, strap, or other mechanical faster (not shown) is used to removably attach the lower shell 34 of the roof assembly 24 to the support system 14 or other roof support structure, thereby allowing the entire windshield system 12 to be removably attached to any type of utility vehicle, golf cart, or the like.

In the exemplary embodiment illustrated in FIGS. 3-4A, the upper shell 32 and the lower shell 34 together form a two-piece hollow protective casing configured to selectively store the windshield 46 therewithin as well as provide shade and protection from the elements to the occupants of the utility vehicle 10. The upper and lower shells 32, 34 can be formed of thermoformed ABS, injection molded plastic, fiberglass, plastic, metal, or any other material sufficient to withstand the change in environmental elements and conditions as well as sufficiently rigid to withstand the stresses due to off-road travel by the utility vehicle 10. When the upper and lower shells 32, 34 are attached to each other, the recess 36 formed therebetween is large enough to completely surround the windshield 46 when the windshield is stored therebetween. In an embodiment, the lower shell 34 is fixedly attached to the upper shell 32. In another embodiment, the lower shell 34 is removably attached to the upper shell 32, wherein the opposing shells can be separated to allow the windshield assembly 28 or track assembly 26 to be serviced, removed, or replaced. When the lower shell 34 is attached to the upper shell 32, an opening 40 (FIG. 4B) is formed at the forwardly-directed end of the shells into the recess 36.

In an embodiment, the visor 30 is an elongated member that is selectively rotatable relative to the roof assembly 24, as shown in FIGS. 3 and 4A-4D. The visor 30 is positioned adjacent to the front portion of the roof assembly 24 and extending laterally between from the lateral sides of the roof assembly 24 between the pair of front pillars 16. The visor 30 is rotatable between a closed position (FIG. 4A) and an opened position (FIG. 4B) relative to the roof assembly 24. When the visor 30 is in the closed position, the visor 30 is configured to provide additional shade protection to operators within the utility vehicle 10 while simultaneously securing the windshield assembly 28 within the roof assembly 24. When the visor 30 is in the opened position, the visor 30 is configured to allow the windshield assembly 28 to be withdrawn from the recess 36. In an embodiment, the visor 30 is manually rotatable between the closed and opened positions. In another embodiment, the rotation of the visor 30 between the closed and opened positions can be selectively controlled by the operator by way of an electronic switch or the like. The visor 30 can be formed of billet aluminum, fiberglass, extruded plastic, metal, or any other material sufficient to withstand the change in environmental elements and conditions as well as sufficiently rigid to withstand the stresses due to off-road travel by the utility vehicle 10.

In the exemplary illustrated embodiment, the track assembly 26 is configured to allow the windshield assembly 28 to selectively slide into and out of the recess 36 when the visor 30 is in the open position, as shown in FIGS. 4A-4D. The track assembly 26 is positioned within the recess 36 of the roof assembly 24. In an embodiment, the track assembly 26 is integrally formed with either the upper shell 32 or the lower shell 34. In the illustrated embodiment, the track assembly 26 is formed separately from the upper and lower shells 32, 34 and attached to the upper or lower shell 32, 34 during assembly.

In an embodiment, the track assembly 26 includes a pair of opposing rails 42 that extend substantially horizontal, or parallel to the longitudinal axis of the roof assembly 24, as shown in FIGS. 3 and 4A-4D. The rails 42 have a C-channel cross-sectional shape, and the rails 42 are positioned within the recess 36 such that the C-channel is directed inwardly and toward the opposing rail 42. In the illustrated embodiment, the rails 42 are substantially linear members. In another embodiment, each rail 42 has an elongated linear section extending from the forward distal end thereof and a lowered or offset section near the rear distal end thereof with a transition section between the linear and offset sections. The rearwardly-directed end of each rail 42 is sealed to prevent the windshield assembly 28 from becoming disengaged from the rails 42 when moved into the stored position. Each C-channel rail 42 includes a cap 44 positioned at each distal end thereof to enclose the end of the rail 42 and prevent the windshield 46 from becoming derailed by sliding past the end(s) of the rails 42. The caps 44 are removable to allow the windshield assembly 28 to be removed for repair or replacement. The track assembly 26 is configured to receive a wheel bearing of the windshield assembly 28 within each rail 42, as will be explained below.

Figure 4B:
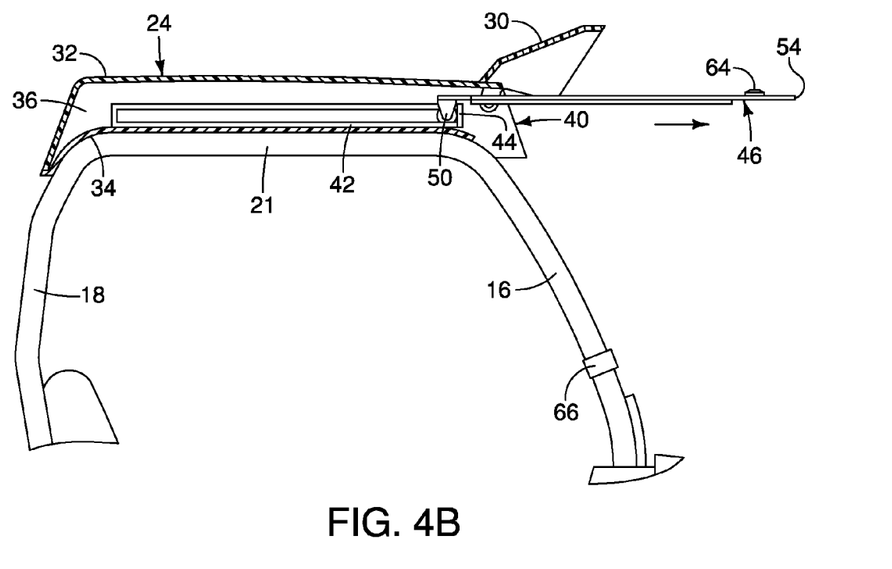
FIG. 4B is a cross-sectional view of the storable windshield system with the windshield in the extended position.
Figure 4C:
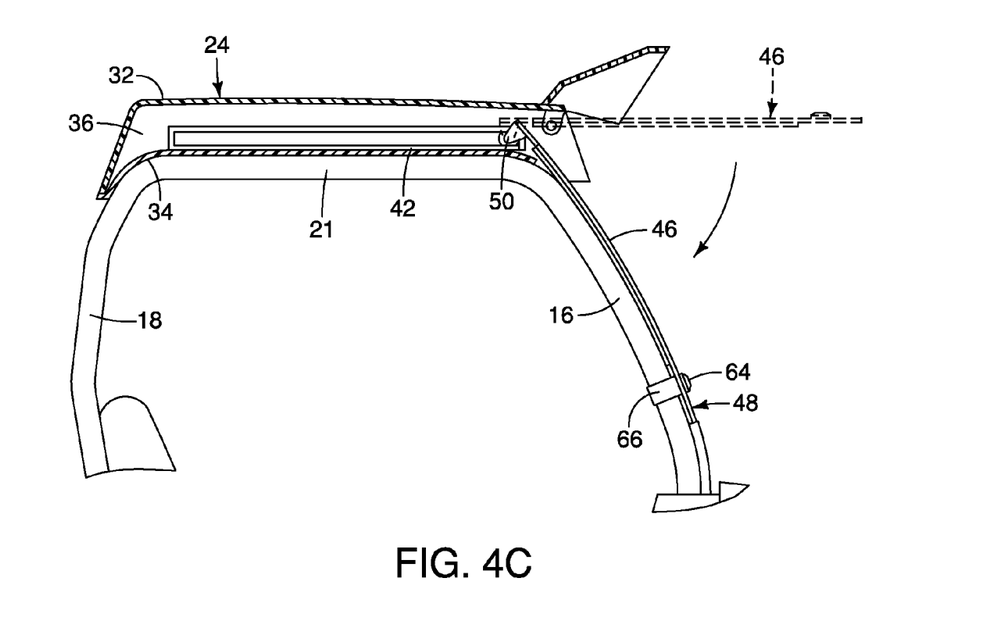
FIG. 4C is a cross-sectional view of the storable windshield system with the windshield in the rotated position.
Figure 4D:
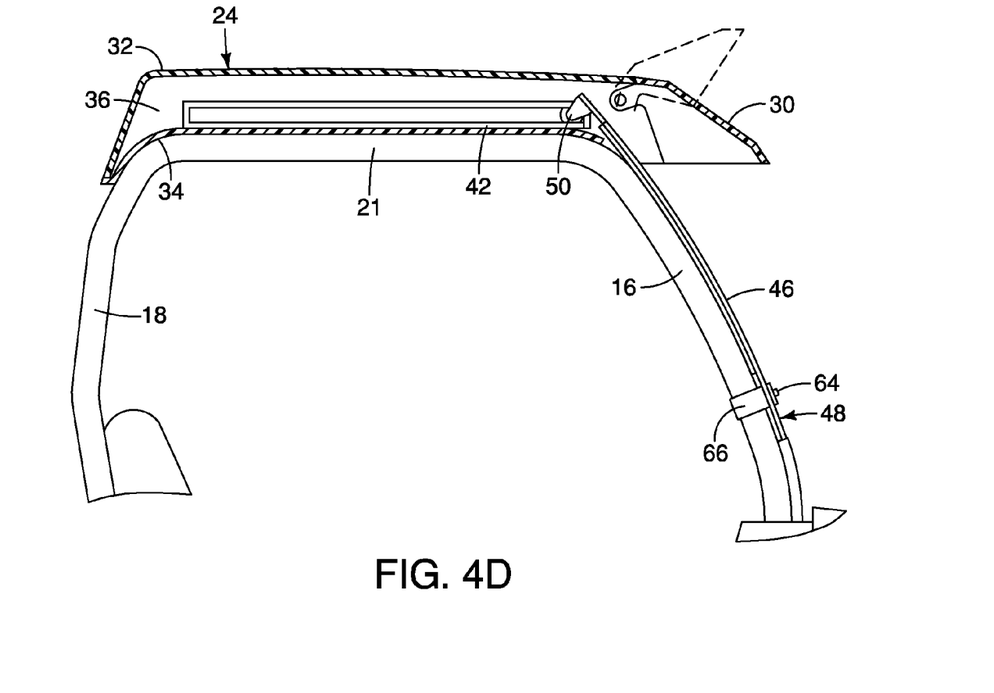
FIG. 4D is a cross-sectional view of the storable windshield system with the windshield in the installed position.
Figure 5:
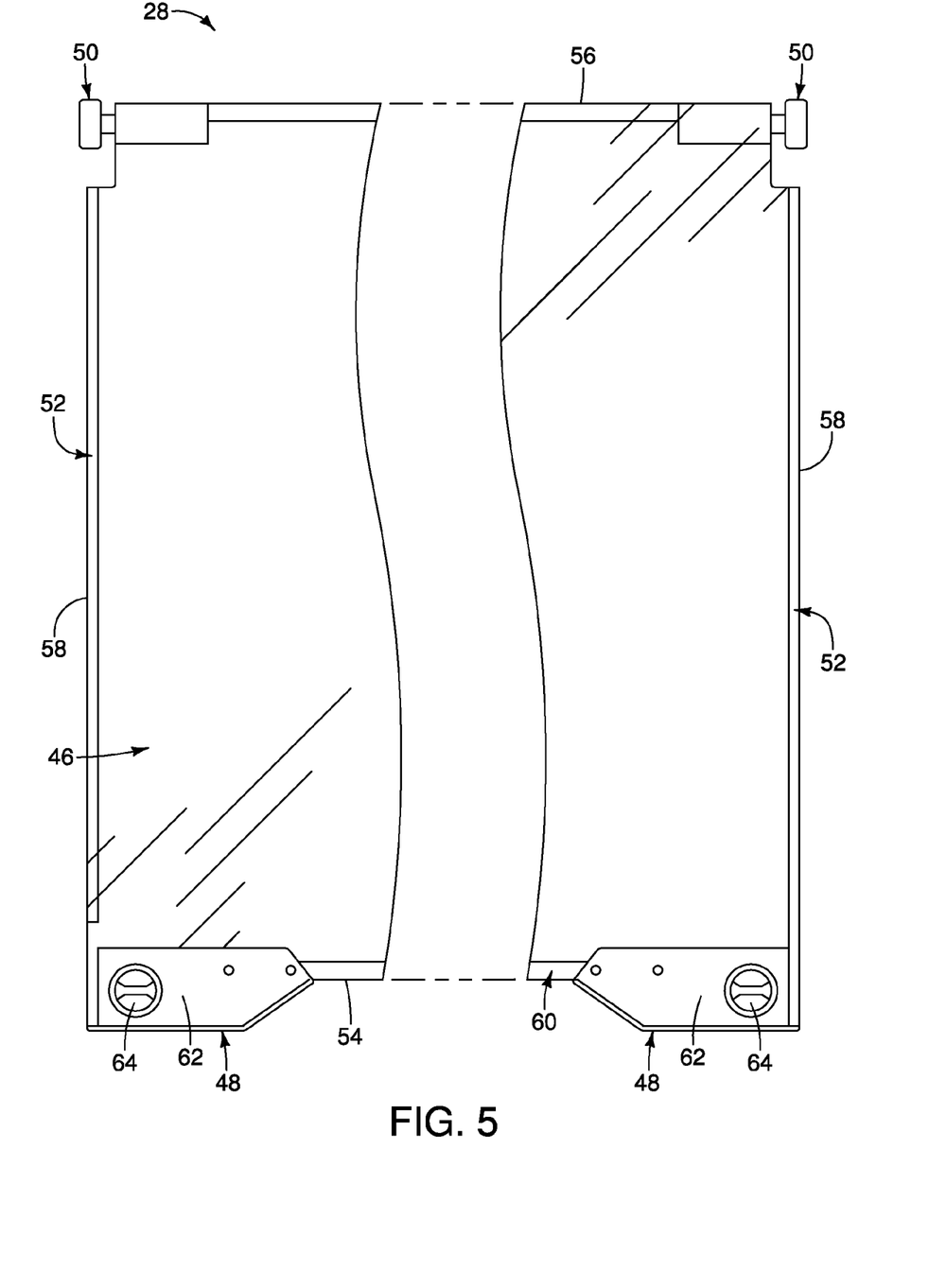
FIG. 5 is a top view of and embodiment of a windshield assembly.

The windshield assembly 28 is operatively connected to the track assembly 26, whereby the windshield assembly 28 is both slidable and rotatable relative to the track assembly 26, as shown in FIGS. 4A-4D. In an embodiment, the windshield assembly 28 includes a windshield 46, a locking assembly 48 attached to the windshield 46, a wheel bearing 50 operatively connected to the windshield 46, and a pair of protective sliding members 52, as shown in FIGS. 3-5. The windshield 46 can be formed of glass, acrylic plastic, polycarbonate, or any other transparent material sufficient to allow an operator of the utility vehicle 10 to be able to see therethrough as well as provide protection for the operator during inclement weather. In an embodiment, the windshield 46 is a substantially flat member having sufficient flexibility to generally conform to the opening and curvature of the front viewport 22. The windshield 46 includes a leading edge 54, a trailing edge 56, and a pair of lateral edges 58 extending between the leading and trailing edges 54, 56. A laterally-aligned support member 60 is attached to the windshield 46 adjacent to the leading edge 54, wherein the support member 60 extends a portion of the lateral distance of the windshield 46. The windshield 46 is securable to the front pillars 16 by way of a pair of locking assemblies 48, wherein each locking assembly 48 is positioned adjacent to an opposing front corner along the leading edge 54 of the windshield 46. The locking assemblies 48 are configured to secure and positively position the leading edge 54 of the windshield 46 relative to the utility vehicle 10 while the trailing edge 56 of the windshield 46 remains engaged with the roof assembly 24 by way of the wheel bearing 50.

In an embodiment, each locking assembly 48 includes a bracket 62 and a knob assembly 64 that are operatively connected to the windshield 46, as shown in FIG. 5. Each locking assembly 48 corresponds with a receiving member 66 (FIGS. 7A-7B) that is operatively connected to one of the front pillars 16 to allow the windshield 46 to be removably attachable to the support system 14. The bracket 62 includes an aperture formed through the thickness thereof for receiving the knob assembly 64. The bracket 62 also includes a groove formed configured to receive the lateral support member 54 such that the lateral support member 54 is sandwiched between the bracket 62 and the windshield 46.

The knob assembly 64 of the locking assembly 48 attached to the windshield assembly 28, as shown in FIGS. 5 and 6A-6C, is a generally circular member that is rotatable relative to the bracket 62. The knob assembly 64 includes a grip 68 which is an elongated projection that extends from the base 70. The grip 68 allows the operator to grasp the knob assembly 64, wherein the operator can rotate the knob assembly 64 by twisting or rotating the grip 68. The knob assembly 64 is rotatable in both the clockwise and counter-clockwise directions. A flange 72 extends radially outward from the base 70. A substantially circular multi-pole magnet 74 is fixedly attached to the rear surface of the flange 72 extending away from the base 70. The knob assembly 64 that is rotatably attachable to the windshield 46 is configured to be selectively attachable to a corresponding receiving member 66 (FIGS. 1 and 4A-4D) attached to the front pillar 16 of the support system 14 for securing the windshield 46 in an installed position.

In an embodiment, each wheel bearing 50 is operatively connected to a rear corner of the windshield 46, as shown in FIG. 5. The wheel bearings 50 are received in the rails 42 such that the wheel bearings 50 are rollingly engaged with the rails 42 (FIG. 3). Rotation of the wheel bearings 50 allow the rear portion of the windshield 46 to slide or translate relative to the stationary rails 42 as well as rotate relative to the rails 42 when the windshield 46 is extended or withdrawn from the recess 36. It should be understood by one of ordinary skill in the art that any other mechanism that allows the windshield 46 to both slide and rotate relative to the rails 42 can be used. In an embodiment, a sliding member 52 is attached to the lower surface of the windshield 46 adjacent to each of the opposing lateral edges 58. The sliding member 52 acts as a skid- or wear-resistant barrier between the windshield 46 and the rails 42. Because the windshield 46 is positioned above the rails 42, as the windshield 46 is extended or retracted relative to the rails 42, the lower surface of the windshield 46 would otherwise contact and slide against the rails 42. The sliding member 52 protects the windshield 46 from scraping against the rails 42. The sliding member 52 can be formed of metal, Teflon®, or any other material sufficient to allow the windshield 46 to slide relative to the rails 42.

Figure 7A:
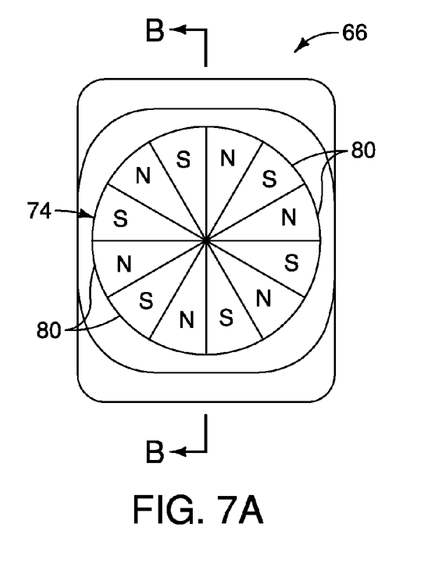
FIG. 7A is a front view of an embodiment of a receiving member.
Figure 7B:
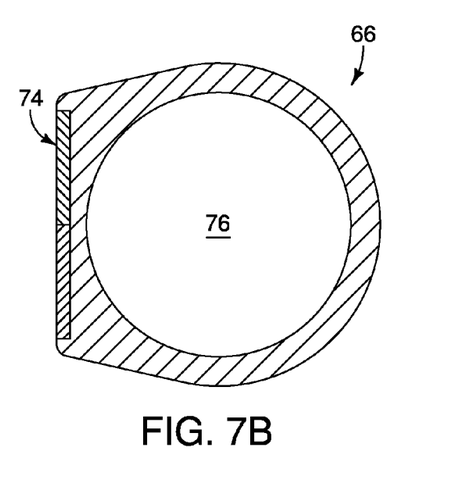
FIG. 7B is a cross-sectional view of the receiving member shown in FIG. 7A.

In an embodiment, the exemplary embodiment of a receiving member 66 shown in FIGS. 7A-7B is a substantially ring-shaped member having a central bore 76 extending through the thickness of the receiving member 66. The central bore 76 is sized and shaped to receive one of the front pillars 16 therein for securing the receiving member 66 to the front pillar 16. The receiving member 66 also includes a detent for receiving a multi-pole magnet 74, similar to the multi-pole magnet 74 of the knob assembly 64. The receiving member 66 is attached to the front pillar 16 such that the multi-pole magnet 74 is directed forwardly such that when the windshield 46 is rotated downwardly to the installed position the opposing multi-pole magnets 74 are substantially aligned. In an embodiment, the receiving member 66 is fixedly attached to the front pillar 16 to prevent rotation of the receiving member 66 relative to the pillar. In another embodiment, the receiving member 66 can be easily removed from the front pillar 16 and re-attached to another front pillar or other similar support structure of a different vehicle to which the windshield system 10 is attachable.

Figure 6A:
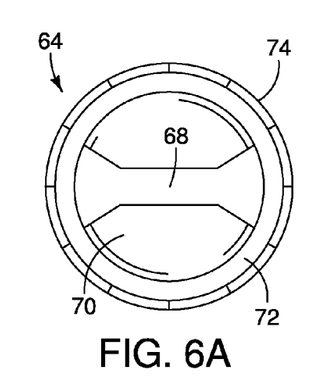
FIG. 6A is a top view of an embodiment of a knob assembly.
Figure 6B:
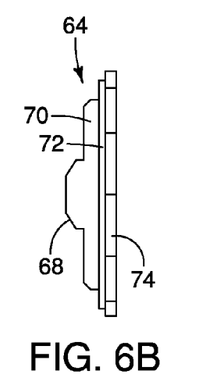
FIG. 6B is a side view of the knob assembly shown in FIG. 6A.
Figure 6C:
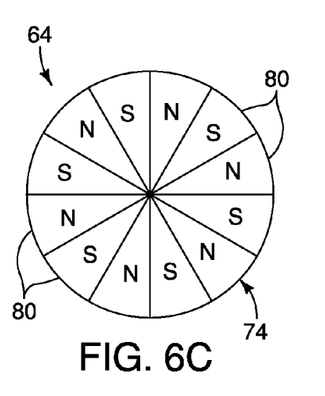
FIG. 6C is a front view of the knob assembly shown in FIG. 6A.

The multi-pole magnets 74 attached to both the knob assembly 64 and the receiving member 66 are substantially circular magnets having multiple poles that extend radially outward from the center of each magnet, as shown in FIGS.

6C and 7A. The exposed face of each magnet is divided into a plurality of quadrants 80 in which each quadrant has a different polarity relative to the quadrants on both sides thereof. In the illustrated exemplary embodiment, each multi-pole magnet 74 is divided into twelve (12) quadrants 80. The first, third, fifth, etc. quadrants 80 have a positive/North polarity, and the second, fourth, sixth, etc. quadrants 80 have the opposing negative/South polarity. Although the magnets are shown and described as having four quadrants, other embodiments of the magnets 74 can be formed as having between 2-16 quadrants, provided at least two of the quadrants have opposite polarity. It should be understood by one of ordinary skill in the art that both of the multi-pole magnets 74 should have the same number of quadrants 80.

The multi-pole magnets 74 are formed by an extrusion process in which each of the quadrants 80 is integrally connected with the adjacent quadrant. In another embodiment, the multi-pole magnets 74 are generated by forming wedge-shaped quadrants 80 of different polarity and fixedly attaching the edges separate quadrants to the knob assembly 64 or receiving member 66 such that the polarity of adjacent quadrants are alternating. In operation, when the multi-pole magnets 74 are positioned immediately adjacent to each other such that like poles of each magnet are aligned the magnets are repelled from each other, and when the magnets are positioned immediately adjacent to each other such that opposing poles of each magnet are aligned the magnets are attracted to each other. The grip 68 allows the operator to rotate the multi-pole magnet 74 attached to the knob assembly 64 relative to the substantially fixed second multi-pole magnet 74 of the receiving member 66 to either engage or disengage the locking assembly 48 relative to the front pillars 16 of the utility vehicle 10. Although the exemplary embodiment of the locking assembly 48 shown and described herein includes a pair of opposing multi-pole magnets positioned adjacent to both corners along the leading edge 54 of the windshield 46, it should be understood by one of ordinary skill in the art that the locking assembly 48 can be formed of a mechanical latching mechanism or any other mechanism that can be actuated to secure or release the windshield 46 relative to the support system 14 or other support structure.

The storable windshield system 12 provides a windshield 46 that can be stored within a roof assembly 24 positioned above the support system 14 of a utility vehicle 10 or positioned to cover the front viewport 22 of the utility vehicle 10. The storable windshield system 12 is self-contained, meaning that the system can be easily attached to any utility-type vehicle having sufficient supporting structures that allow the system to be mounted upon as well as be easily removed from one vehicle and easily installed on a separate vehicle.

In operation, when the storable windshield system 12 is attached to the support system 14 of a utility vehicle 10, the windshield 46 is in a first operative position, or the stored position, and the visor 30 is in a closed position, as shown in FIG. 4A. To extend the windshield 46, the visor 30 is rotated to the opened position, thereby exposing the windshield 46 through the opening 40 of the roof assembly 24, as shown in FIG. 4A. The windshield 46 is then pulled forwardly such that the leading edge 54 of the windshield 46 is withdrawn through the opening 40, as shown in FIG. 4B. The windshield 46 is withdrawn in a linear, sliding manner from the roof assembly 24 until the wheel bearing 50 contacts the caps 44 at the forward distal end of the rails 42, locating the windshield 46 in a second operative position, or the withdrawn position. Once the windshield 46 is extended to a fully extended position relative to the roof assembly 24, the windshield 46 is rotated downwardly such that the windshield 46 covers the front viewport 22. The windshield 46 is rotated downwardly until the multi-pole magnet 74 of each locking assembly 48 attached to the windshield 46 is substantially aligned with the corresponding multi-pole magnet 74 of the receiving member 66, wherein the windshield 46 is in the installed position, as shown in FIG. 4C. The visor 30 is then rotated downwardly to the closed position. The operator rotates the grip 68 of the knob assembly 64 until opposite polarities of the opposing multi-pole magnets 74 are aligned, wherein the magnetic attraction between the magnets 74 cause the locking assembly 48 to be locked to the receiving member 66, as shown in FIG. 4D.

To return the windshield 46 to the stored position within the roof assembly 24 from the installed position, the locking assembly 48 is unlocked by rotating the knob assembly 64 until like polarities of the opposing multi-pole magnets 74 are aligned and the magnets are repelled away from each other. The visor 30 is rotated from the closed position to the opened position and the windshield 46 is then rotated upwardly such that the lateral edges 52 are substantially parallel relative to the rails 42 and the windshield 46 is then slid rearwardly into the recess 36 of the roof assembly 24 until the wheel bearing 50 contact the closed rear distal ends of the rails 42. The visor 30 is then rotated downwardly back to the closed position, thereby securing the windshield 46 within the recess 36.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

The invention claimed is:

1. A storable windshield system attached to a support system of a utility vehicle, said storable windshield system comprising:

a roof assembly having a recess formed therein;

a windshield assembly operatively connected to said roof assembly, said windshield assembly is slidable relative to said roof assembly between a stored position and an extended position and rotatable relative to said roof assembly between said extended position and an installed position located immediately adjacent to said support system; and a locking mechanism for securing said windshield to said support system when said windshield is in said installed position, wherein said locking mechanism includes a rotatable knob assembly attached to said windshield assembly and a receiving member attached to said support system, wherein said knob assembly is selectively attachable to said receiving member, and wherein a first multi-pole magnet is attached to said rotatable knob assembly and a second multi-pole magnet is attached to said receiving member, and quadrants of said multi-pole magnets are selectively alignable for attaching or releasing said knob assembly relative to said receiving member.

2. The storable windshield system of claim 1 further comprising a track assembly attached to said roof assembly and positioned within said recess, said track assembly including a pair of opposing rails and each of said rails receives a sliding mechanism operatively connected to said windshield assembly to allow said windshield assembly to slide and rotate relative to said track assembly.

3. The storable windshield system of claim 2, wherein said sliding mechanism is a wheel bearing.

4. The storable windshield system of claim 1 further comprising a visor rotatably connected to said roof assembly, wherein said visor is rotatable between a closed position and an opened position relative to said roof assembly.

5. A storable windshield system attached to a support system of a utility vehicle, said support system forming a front viewport for said utility vehicle, said storable windshield system comprising:
- a roof assembly attached to said support system, said roof assembly formed of an upper shell and a lower shell attached to said upper shell, wherein said roof assembly defines a recess therewithin;
- a track assembly operatively attached to said roof assembly within said recess;
- a windshield assembly operatively connected to said track assembly, wherein said windshield assembly is slidable relative to said roof assembly for selectively storing said windshield assembly within said recess, and said windshield assembly is rotatable relative to said roof assembly for selectively engaging said support system, wherein said windshield assembly is slidable relative to said roof assembly between a first operative position in which said windshield assembly is positioned within said recess and a second operative position in which said windshield assembly is extended relative to said recess; and
- a locking mechanism, wherein said locking mechanism includes a first multi-pole magnet rotatably connected to said windshield assembly and a second multi-pole magnet attached to said support system, and rotation of said first multi-pole magnet relative to said second multi-pole magnet selectively engages and disengages said first and second multi-pole magnets.

6. The storable windshield system of claim 5, wherein said windshield assembly includes a windshield and a pair of wheel bearings attached to opposing corners of said windshield, said wheel bearings rollingly engageable with said track assembly for allowing said windshield to be slidable and rotatable relative to said roof assembly.

7. The storable windshield system of claim 6, wherein each of said wheel bearings is attachable to said corner adjacent to a trailing edge of said windshield.

8. The storable windshield system of claim 5, wherein said windshield assembly is rotatable relative to said roof assembly between said second operative position and a third operative position in which said windshield assembly is positioned adjacent to said viewport.

9. The storable windshield system of claim 5, wherein each of said first and second multi-pole magnets is divided into a plurality of quadrants, and each of said quadrants has a magnetic polarity.

10. The storable windshield system of claim 9, wherein said magnetic polarity of each of said quadrants is opposite said magnetic polarity of each adjacent quadrant.

11. A storable windshield system attached to a support system of a utility vehicle, said storable windshield system comprising:
- a roof assembly removably attachable to said support system, said roof assembly defining a recess therewithin;
- a track assembly attached to said roof assembly within said recess, wherein said track assembly includes a pair of opposing rails;
- a windshield assembly operatively connected to said track assembly, wherein said windshield assembly includes a windshield and a pair of wheel bearings attached to said windshield, said wheel bearings being engageable with said track assembly;
- a pair of locking mechanisms attached to opposing corners of said windshield adjacent to a leading edge of said windshield, wherein each of said locking mechanisms includes a first multi-pole magnet operatively and rotatably connected to said windshield and a second multi-pole magnet operatively connected to said support system, and selective rotation of said first multi-pole magnet relative to said second multi-pole magnet causes said windshield to be engageable or disengageable from said support system;
- wherein said windshield is slidable relative to said rails between a first operative position and a second operative position, and said windshield is rotatable relative to said rails between said second operative position and a third operative position, said windshield being storable within said recess when in said first operative position and selectively engageable with said support system when in said third operative position.

\* \* \* \* \*